(12) United States Patent
Gatt et al.

(10) Patent No.: US 12,320,758 B2
(45) Date of Patent: Jun. 3, 2025

(54) SYSTEM AND METHOD FOR INSPECTION OF MULTIPLE FEATURES OF PATTERNED OBJECTS IN THE MANUFACTURE OF ELECTRICAL CIRCUITS

(71) Applicant: Orbotech Ltd., Yavne (IL)

(72) Inventors: Vered Gatt, Rehovot (IL); Itzhak Saki Hakim, Kfar Saba (IL); Chay Goldenberg, Tel Aviv (IL); Mordehay Amirim, Tkuma (IL)

(73) Assignee: Orbotech Ltd., Yavne (IL)

( * ) Notice: Subject to any disclaimer, the term of this patent is extended or adjusted under 35 U.S.C. 154(b) by 122 days.

(21) Appl. No.: 17/799,442

(22) PCT Filed: Dec. 29, 2020

(86) PCT No.: PCT/IL2020/051341
§ 371 (c)(1),
(2) Date: Aug. 12, 2022

(87) PCT Pub. No.: WO2021/161298
PCT Pub. Date: Aug. 19, 2021

(65) Prior Publication Data
US 2023/0105983 A1    Apr. 6, 2023

Related U.S. Application Data

(60) Provisional application No. 62/977,273, filed on Feb. 16, 2020.

(51) Int. Cl.
*G01N 21/956*     (2006.01)

(52) U.S. Cl.
CPC . *G01N 21/956* (2013.01); *G01N 2021/95638* (2013.01); *G01N 2201/127* (2013.01)

(58) Field of Classification Search
CPC ....... G01N 21/956; G01N 2021/95638; G01N 2201/127
See application file for complete search history.

(56) References Cited

U.S. PATENT DOCUMENTS

| 6,633,376 B1 | 10/2003 | Nishida et al. |
| 7,181,059 B2 | 2/2007 | Duvdevani et al. |
| 7,200,259 B1 | 4/2007 | Gold et al. |

(Continued)

FOREIGN PATENT DOCUMENTS

| CN | 109389597 A | 2/2019 |
| JP | H08304300 A | 11/1996 |

(Continued)

OTHER PUBLICATIONS

WIPO, International Search Report for PCT/IL2020/051341, Apr. 5, 2021.

(Continued)

*Primary Examiner* — Hung V Nguyen
(74) *Attorney, Agent, or Firm* — Hodgson Russ LLP (57) ABSTRACT

A method for inspection of multiple features of patterned objects in the manufacture of electrical circuits, the method including performing defect detection on the patterned object, employing an optical defect detection machine (ODDM) and employing the ODDM to measure at least one of spatial coordinates and physical attributes of at least some of the multiple features.

21 Claims, 7 Drawing Sheets

(56) References Cited

U.S. PATENT DOCUMENTS

| | | | |
|---|---|---|---|
| 7,206,443 B1 | 4/2007 | Duvdevani et al. | |
| 7,388,978 B2 | 6/2008 | Duvdevani et al. | |
| 7,745,792 B2* | 6/2010 | Breit | G01N 21/3581 |
| | | | 250/341.8 |
| 9,157,874 B2* | 10/2015 | Tan | G01N 23/046 |
| 9,348,964 B2* | 5/2016 | Zhang | G06F 30/398 |
| 9,689,923 B2* | 6/2017 | Kekare | H01L 22/14 |
| 9,916,965 B2* | 3/2018 | Bhaskar | G06N 3/08 |
| 10,359,371 B2* | 7/2019 | Duffy | G06T 7/001 |
| 2002/0093650 A1 | 7/2002 | Zemer et al. | |
| 2009/0028423 A1 | 1/2009 | Sandstrom et al. | |
| 2013/0230144 A1 | 9/2013 | Tan et al. | |

FOREIGN PATENT DOCUMENTS

| | | |
|---|---|---|
| JP | H11118853 A | 4/1999 |
| JP | 2003149171 A | 5/2003 |
| JP | 2007024737 A | 2/2007 |
| JP | 2017040522 A | 2/2017 |
| JP | 2017207329 A | 11/2017 |
| TW | 201346213 A | 11/2013 |
| TW | 201432218 A | 8/2014 |
| TW | 201901143 A | 1/2019 |
| WO | 2018104931 A1 | 6/2018 |

OTHER PUBLICATIONS

Baygin et al., "Machine vision based defect detection approach using image processing", International Artificial Intelligence and Data Processing Symposium (IDAP), Sep. 16, 2017, pp. 1-5, IEEE.

WIPO, International Preliminary Report on Patentability for International Application No. PCT/IL2020/051341, Aug. 11, 2022.

JPO, Office Action for JP Application No. 2022-549133, Apr. 9, 2024.

EPO, Supplementary European Search Report issued for EP Application No. 20918665.9, Jan. 12, 2024.

TIPO, Office Action issued for TW Application No. 110104414, May 7, 2024.

JPO, Second Office Action issued for JP Application No. 2022-549133, Nov. 5, 2024.

\* cited by examiner

SYSTEM AND METHOD FOR INSPECTION OF MULTIPLE FEATURES OF PATTERNED OBJECTS IN THE MANUFACTURE OF ELECTRICAL CIRCUITS

FIELD OF THE INVENTION

The present invention relates to systems and methods for inspecting electrical circuits, particularly during the manufacture thereof.

BACKGROUND OF THE INVENTION

Various types of inspection systems and methods are known in the art.

SUMMARY OF THE INVENTION

The present invention seeks to provide improved systems and methods for inspection of patterned objects during the manufacture of electrical circuits.

There is thus provided in accordance with a preferred embodiment of the present invention a method for inspection of multiple features of patterned objects in the manufacture of electrical circuits, the method including performing defect detection on the patterned object, employing an optical defect detection machine (ODDM) and employing the ODDM to output at least one of spatial coordinates and physical attributes of at least some of the multiple features.

Preferably, the ODDM includes a PCB inspection machine. In accordance with a preferred embodiment of the present invention the ODDM includes an automated optical inspection machine for electrical circuits.

In accordance with a preferred embodiment of the present invention the employing the ODDM to output includes employing at least one of a motion sensor, an accelerometer, a distance sensor, a three-dimensional (3D) sensor and a temperature sensor to increase spatial accuracy of measurement of the physical attributes. Additionally or alternatively, the employing the ODDM to output also includes employing a calibration target.

Preferably, the employing the ODDM to output also includes employing multiple discrete electromagnetic spectral frequency bands. In accordance with a preferred embodiment of the present invention the employing the ODDM to output includes employing multiple, mutually spatially offset images at the multiple discrete electromagnetic spectral frequency bands. Additionally, the employing the ODDM to output includes the multiple, mutually spatially offset images at the multiple discrete electromagnetic spectral frequency bands to study the way three-dimensional changes in patterned objects are visible in a two-dimensional image.

Preferably, the employing the ODDM to output also includes employing a high accuracy measurement sensor to detect a bias in measurements by the ODDM and compensating for the bias in run time.

In accordance with a preferred embodiment of the present invention the employing the ODDM to output also includes measuring distortion in measurement of the physical attributes of at least some of the multiple features as a function of the location of at least some of the multiple features in a field of view and cropping the field of view to a region having acceptably low distortion. Additionally, the measuring distortion takes place during calibration of the ODDM. Additionally, the measuring distortion, which takes place during calibration of the ODDM, includes compensating by employing calibration tables. Alternatively, the measuring distortion takes place during run time of the ODDM.

In accordance with a preferred embodiment of the present invention the ODDM is operated, when inspecting multiple identical patterned objects, so as not necessarily to measure all of the multiple features of all of the patterned objects in each scan but to ensure that each of the multiple features is measured in at least one scan.

In accordance with a preferred embodiment of the present invention the ODDM is operated to produce multiple scans at at least two different resolutions. Preferably, at least one lower resolution is employed for ensuring positional accuracy and at least one higher resolution is employed for the measuring the attributes.

In accordance with a preferred embodiment of the present invention the method also includes evaluating in run time correspondence between the measurements of the physical attributes and reference Computer Aided Manufacturing (CAM) data for at least some of the physical attributes in order to compensate for distortions attributable to operation of the ODDM. Additionally, the method also includes compensating in run time for distortions attributable to operation of the ODDM.

There is also provided in accordance with another preferred embodiment of the present invention a system for inspection of multiple features of patterned objects in the manufacture of electrical circuits, the system including an inspection subsystem operative to detect defects in the patterned object and a physical attribute measurement subsystem operative to output measurements of at least some of the multiple features.

Preferably, the system also includes at least one of at least one of a motion sensor, an accelerometer, a distance sensor, a 3D sensor and a temperature sensor.

In accordance with a preferred embodiment of the present invention the system also includes a high accuracy measurement sensor.

In accordance with a preferred embodiment of the present invention the system also includes at least one high accuracy encoder.

BRIEF DESCRIPTION OF THE DRAWINGS

The present invention will be understood and appreciated from the following detailed description in which.

DETAILED DESCRIPTION OF PREFERRED EMBODIMENTS

Figure 1:
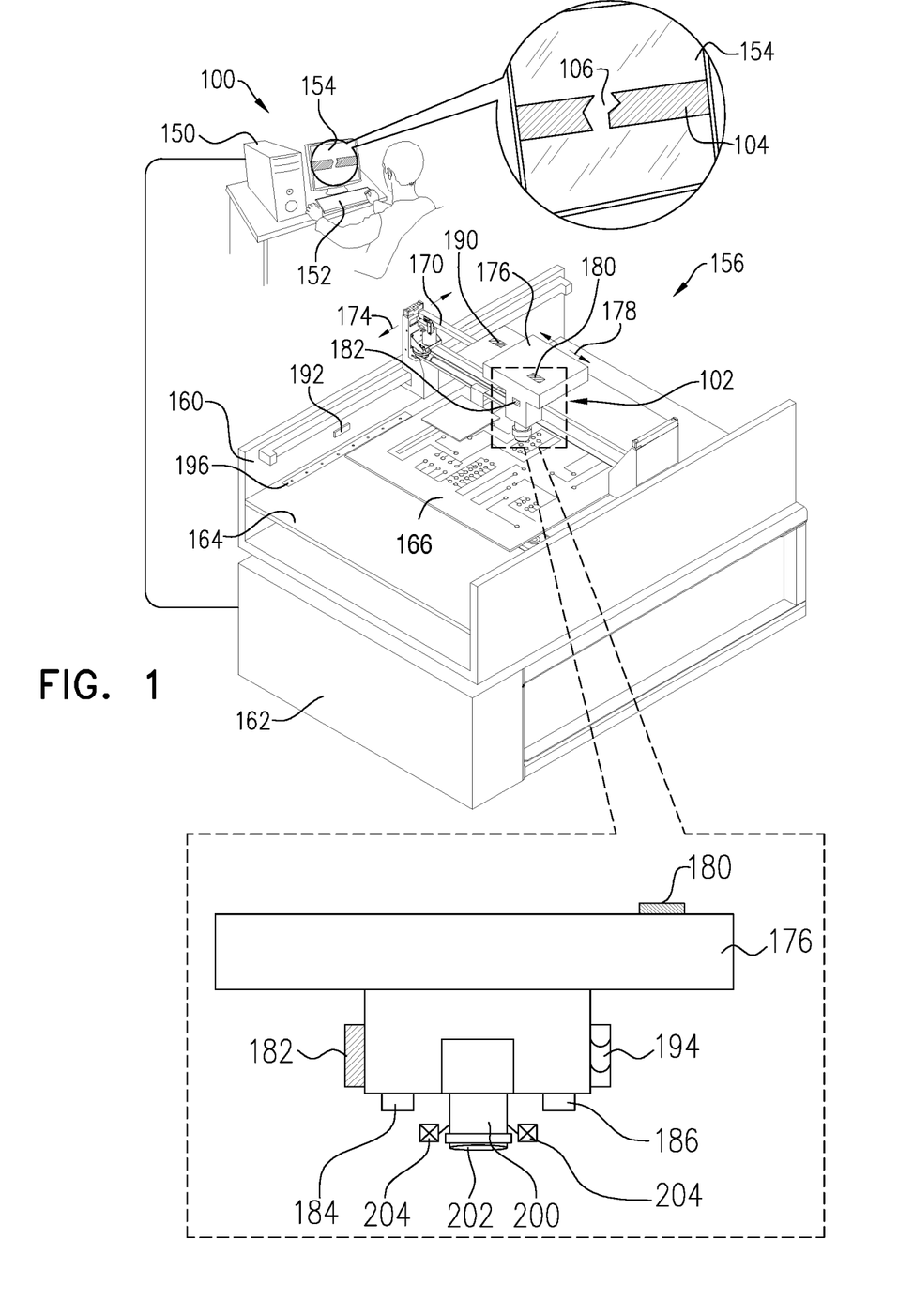
FIG. 1 is a simplified pictorial illustration of an optical defect detection machine (ODDM) useful in the manufacture of electrical circuits, retrofitted to measure physical attributes of multiple features of patterned objects.

Reference is now made to FIG. 1, which is a simplified illustration of an optical defect detection machine (ODDM) useful in the manufacture of electrical circuits, retrofitted to measure physical attributes of multiple features of patterned objects. For the purposes of this patent application, the term "optical defect detection machine" refers to a machine, such as an Orbotech DISCOVERY or Orbotech FUSION machine, commercially available from Orbotech Ltd. of Yavne, Israel, which has a spatial inaccuracy greater than 25 microns.

It is appreciated that the ODDM illustrated in FIG. 1 is a modification of a commercially available optical inspection machine useful for inspecting printed circuit boards.

As seen in FIG. 1, the system preferably includes a workstation 100 and an inspection subsystem 102. Workstation 100 preferably includes a computer 150, including a user input interface 152 and a display 154.

Inspection subsystem 102 preferably comprises a patterned object positioning assembly 156 including a chassis 160, which is preferably mounted on a conventional optical table 162. The chassis 160 defines a patterned object support 164 onto which a patterned object 166, typically an electrical circuit, such as a printed circuit board (PCB), a flexible printed circuit (FPC), electrical circuit artwork or a flat panel display (FPD), to be inspected and/or repaired, may be placed. Patterned object 166 typically includes one or more conductors 104. Patterned object 166 typically has one or more of various types of defects, such as missing conductor defects, for example cut 106.

Patterned object positioning assembly 156 also preferably includes a bridge 170 arranged for linear motion relative to support 164 along a first inspection axis 174 defined with respect to chassis 160. Alternatively, bridge 170 may be fixed and the patterned object 166 may be displaced relative thereto, such as in roll-to-roll processing. As a further alternative, bridge 170 may be fixed and chassis 160 may be displaced with suitable single or multiple axis motion.

Preferably, inspection subsystem 102 also comprises an optical assembly 176, preferably arranged for linear motion relative to bridge 170 along a second inspection axis 178, perpendicular to first inspection axis 174. Alternatively, the optical assembly 176 may be a stationary optical assembly and chassis 160 may be a moveable chassis operative to provide X and/or Y movement of patterned object 166 relative to optical assembly 176.

In accordance with a preferred embodiment of the present invention, optical assembly 176 may be provided with one or more of the following measurement accuracy enhancement (MAE) sensors: an accelerometer 180, such as a VN-100 IMU sensor, commercially available from VectorNav Technologies, Dallas, Texas, USA, a temperature sensor 182, such as an ACCU-CURVE thermistor, commercially available from Ametherm, Carson City, Nevada, USA, a distance sensor 184, such as an LK-G series sensor, commercially available from Keyence Corporation of America, Itasca, Illinois, USA, and a three-dimensional (3D) camera 186, such as a white light interferometer combined with 3D camera, commercially available from Heliotis AG, Lucerne, Switzerland. Preferably, at least one additional accelerometer 190 and at least one additional temperature sensor 192 are mounted on chassis 160 and/or on bridge 170.

Preferably, a high accuracy measurement sensor 194, such as an ALTERA coordinate measurement machine (CMM), commercially available from LK Metrology of Derby, UK, is provided and may be incorporated in the optical assembly 176 or located separately from the inspection machine. Alternatively, high accuracy measurement sensor 194 comprises a high resolution camera with suitable illumination and high quality collection optics.

Preferably, at least one high accuracy encoder 196, such as an MS15, commercially available from RSF Elektronik GmbH, Tarsdorf, Austria, is incorporated in the inspection machine. It may be provided in addition to existing encoders or may replace one or more existing encoders.

The MAE sensors are useful in enhancing the accuracy of measurements made, using the optical assembly 176, of at least one of the physical features of the patterned object 166 being inspected and the spatial coordinates at which such physical features are located. Preferably, the spatial coordinates are measured in a known coordinate system, which is established relative to at least one fiducial, which may be a dedicated fiducial or a feature which is designated as a fiducial. Examples of such physical features include conductor width and/or thickness, conductor spacing, pad diameter and via dimensions.

Workstation 100 preferably also includes software modules operative to operate optical assembly 176 and patterned object positioning assembly 156. Workstation 100 preferably receives at least one image of the patterned object 166 produced by the optical assembly 176 and may also receive reference CAM data from a CAM data source (not shown). Preferably, workstation 100 also receives inputs from MAE sensors, such as sensors 180, 182, 184, 186, 190, 192 and 194, examples of which are illustrated in FIG. 1 and in enlargement A thereof.

As also seen in enlargement A, which is a side view schematic block diagram of optical assembly 176, optical assembly 176 also preferably includes at least one camera 200, which views the patterned object 166, preferably via a lens assembly 202, and provides an image of patterned object 166 on display 154 of workstation 100. Optical assembly 176 also preferably includes an illumination assembly 204.

Figure 2:
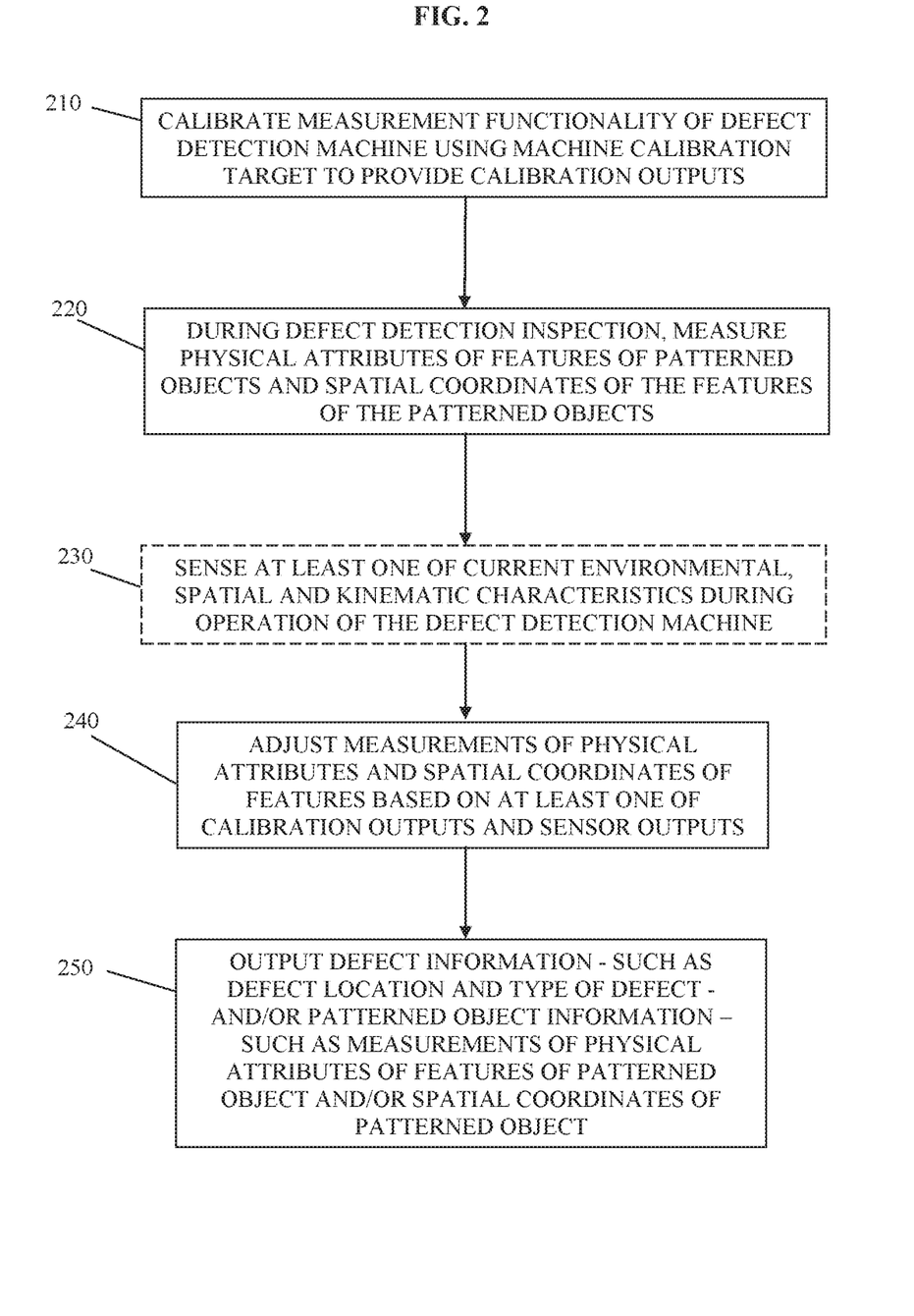
FIG. 2 is a simplified flow chart illustrating the operation of an optical defect detection machine useful in the manufacture of electrical circuits which measures physical attributes of multiple features of patterned objects.

Reference is now made to FIG. 2, which is a simplified flow chart illustrating the operation of an ODDM useful in the manufacture of electrical circuits which measures physical attributes of multiple features of patterned objects.

As seen in FIG. 2, in a first step 210, a measurement functionality of a defect detection machine is calibrated, preferably using a machine calibration target, optionally formed on a glass, ceramic or other suitable surface. The results of the calibration are provided as calibration outputs to the ODDM.

Subsequently, as seen in a next step 220, during defect detection inspection, the ODDM measures the physical attributes of features of patterned objects and the spatial coordinates of the features of the patterned objects in a known coordinate system established by at least one fiducial. The fiducial may be a dedicated fiducial or a physical feature which is designated as a fiducial.

Optionally, as seen in a next step 230, the system may, subsequently or concurrently, sense at least one of current environmental, spatial and kinematic characteristics using one or more sensors during operation of the ODDM. The one or more sensors provide sensor outputs to the ODDM.

Subsequently, as seen in a next step 240, the system adjusts measurements of physical attributes and spatial coordinates of features based on at least one of the calibration outputs and the sensor outputs.

Subsequently, as seen in a next step 250, the ODDM outputs at least one of defect information and patterned object information. The defect information preferably includes the defect location and may also include the spatial coordinates of the defect location. Additionally, the defect information may include a type of defect and any other relevant information about the defect. The patterned object information preferably includes at least measurements of physical attributes of features of the patterned object and may also include the spatial coordinates of the physical attribute being measured.

Figure 3A:
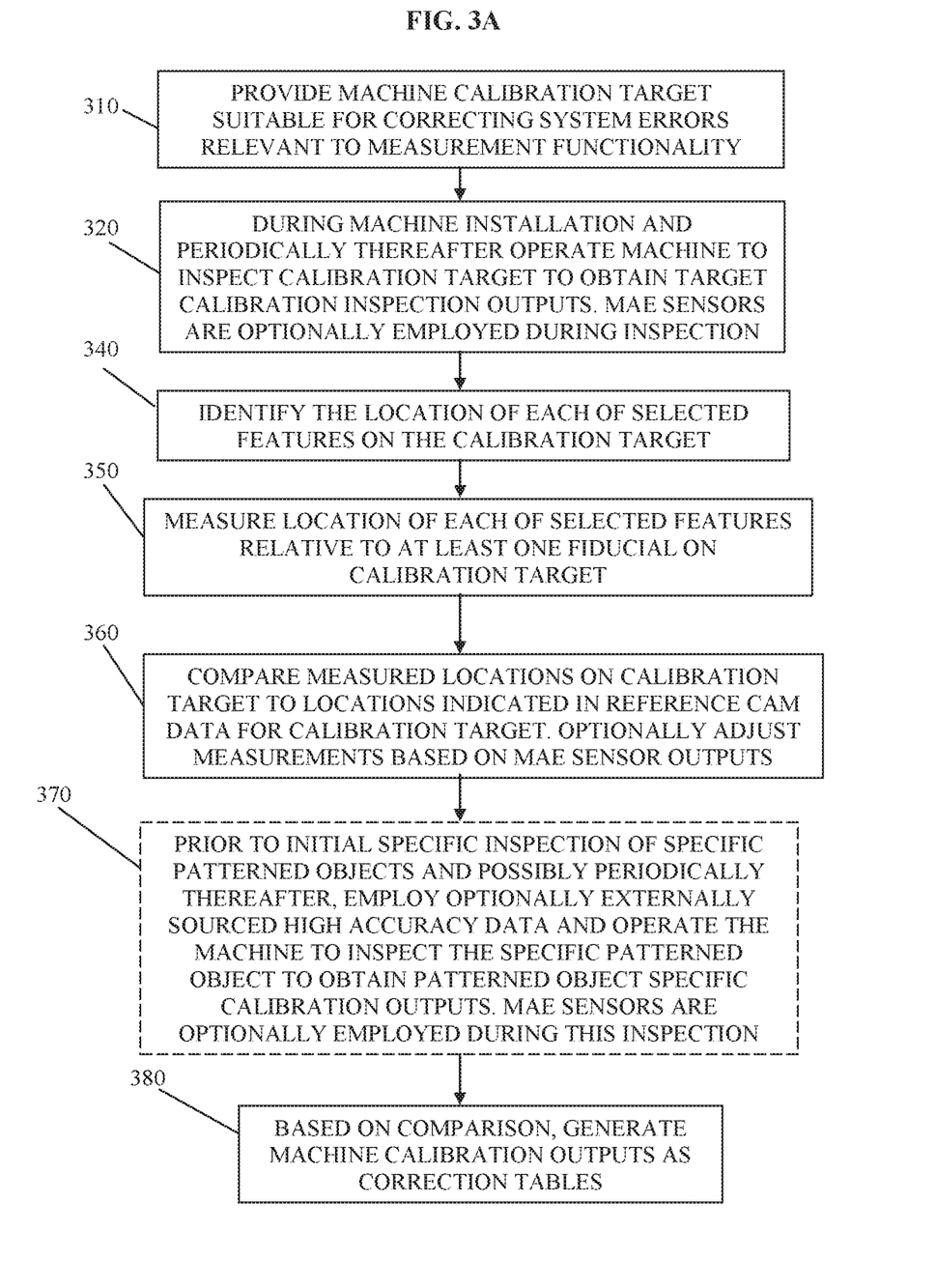
FIGS. 3A and 3B are simplified detailed flow charts of portions of the operation of the optical defect detection machine useful in the manufacture of electrical circuits which measures physical attributes of multiple features of patterned objects.

Reference is now made to FIG. 3A, which is a simplified detailed flow chart of calibration step 210 of FIG. 2, forming a portion of the operation of the ODDM useful in the manufacture of electrical circuits which measures physical attributes of multiple features of patterned objects.

As seen in FIG. 3A, in a first step 310, a machine calibration target suitable for correcting system errors relevant to measurement functionality is provided.

As seen in a next step 320, during machine installation, and periodically thereafter, the ODDM inspects the calibration target. Optionally, the ODDM employs the MAE sensors during this inspection of the calibration target. The results of the inspection are provided as target calibration inspection outputs to the ODDM.

Subsequently, at a next step 340, the spatial coordinates of each of the selected features on the calibration target are identified, preferably automatically. Additionally, physical attributes of predetermined measurement calibration features may also be ascertained.

As seen in a next step 350, the spatial coordinates of each of the selected features relative to at least one fiducial on the calibration target are measured. The at least one fiducial may be a dedicated fiducial or a feature which is designated as a fiducial.

Subsequently, as seen in a next step 360, the measured physical attributes of predefined calibration features and the spatial coordinates of predefined calibration features on the calibration target are compared to the physical attributes and spatial coordinates indicated in their designed value. Optionally, the measured spatial coordinates of predefined calibration features on the calibration target are compared to the spatial coordinates indicated in reference CAM data for the calibration target. Optionally, the measurements are adjusted based on the MAE sensor outputs.

Optionally, as seen in a next step 370, prior to initial specific inspection of specific patterned objects, and possibly periodically thereafter, a high accuracy data source, which may be an external high accuracy data source, such as an image data source, a profiler or a coordinate measurement machine (CMM), is employed and the ODDM is operated to inspect the specific patterned object. Optionally, the ODDM employs the MAE sensors during this inspection. The results of the inspection are provided as patterned object specific calibration outputs to the ODDM.

Finally, as seen in step 380, machine calibration outputs in the form of correction tables are generated based on the comparison in step 360 and step 370.

Figure 3B:
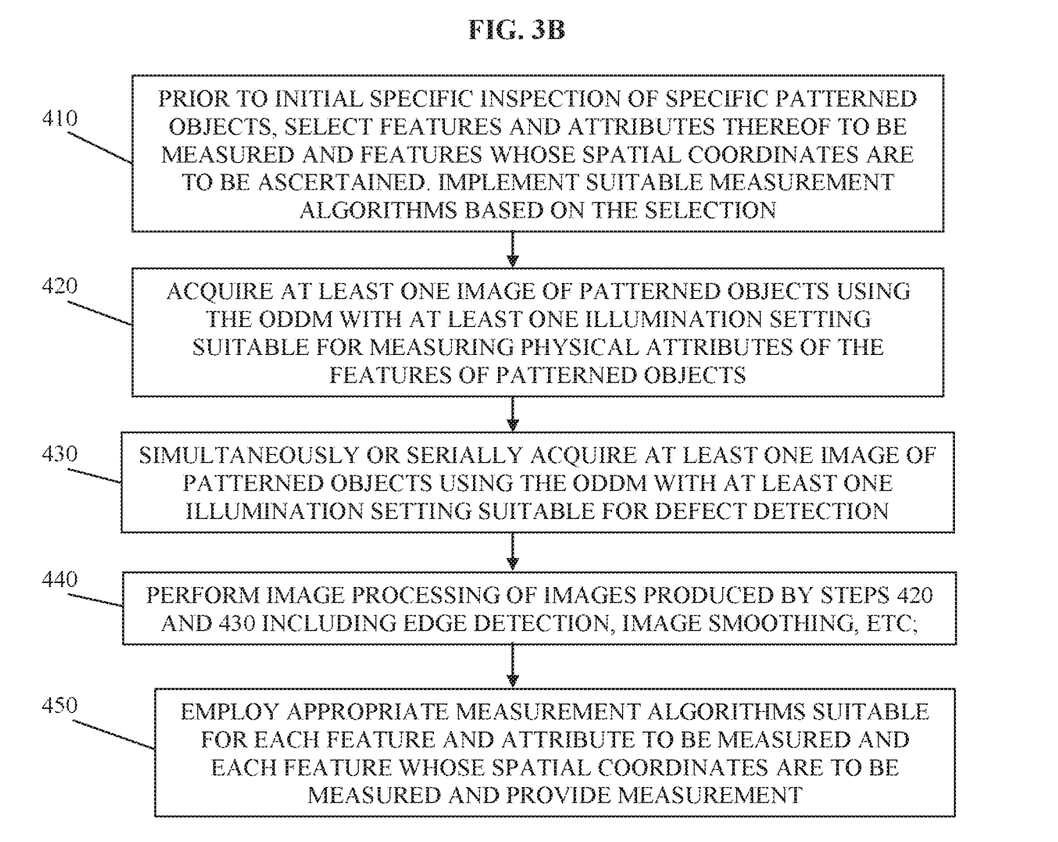

Reference is now made to FIG. 3B, which is a simplified detailed flow chart of measurement step 220 of FIG. 2, forming a portion of the operation of the defect detection machine useful in the manufacture of electrical circuits which measures physical attributes of multiple features of patterned objects.

As seen in FIG. 3B, as seen in a first step 410, prior to initial specific inspection of a specific patterned object, the features and attributes of the specific patterned object to be measured and the features whose spatial coordinates are to be ascertained are selected. Suitable measurement algorithms are implemented based on the selection.

In a subsequent step 420, at least one image of the specific patterned object is acquired, using the ODDM with at least one illumination setting suitable for measuring physical attributes of the features of the patterned object.

As seen in step 430, either simultaneously with or serially to step 420, at least one image of the specific patterned object is acquired, using the ODDM with at least one illumination settings suitable for defect detection.

Subsequently, the at least one image produced by step 420, and optionally the image produced by step 430, is processed using image processing techniques, including edge detection, image smoothing, etc, as seen in step 440.

Finally, as seen in step 450, appropriate measurement algorithms, suitable for each feature and attribute to be measured and each feature whose spatial coordinates are to be measured, are employed to provide the appropriate measurements.

Figure 4:
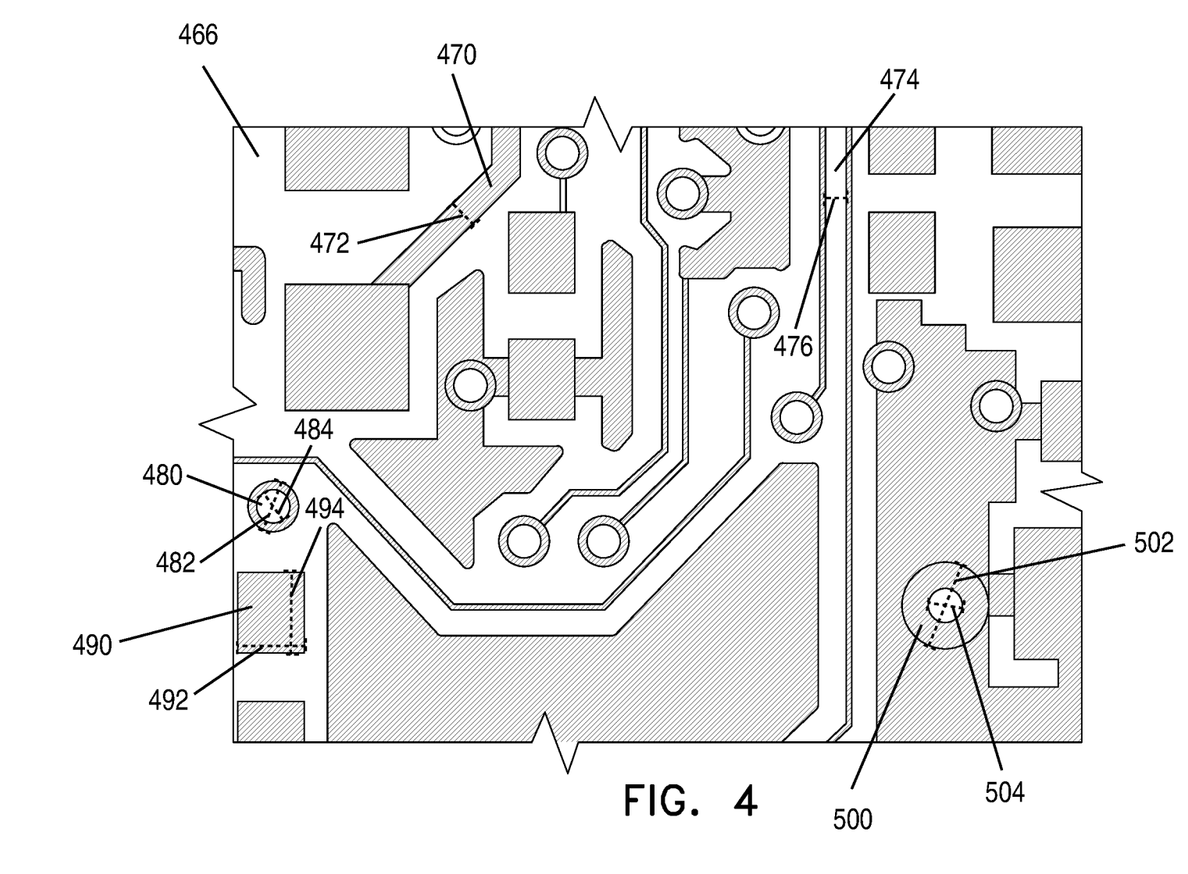
FIG. 4 is a simplified illustration of part of a patterned object, having various typical features whose physical attributes are to be measured.

Reference is now made to FIG. 4, which is a simplified illustration of part of a patterned object, which is annotated to indicate various typical features whose physical attributes are to be measured.

In the example shown in FIG. 4, patterned object 166 is embodied as a panel 466 including an exemplary multiplicity of structures having physical attributes to be measured. The exemplary multiplicity of structures of panel 466 to be measured includes, inter alia, at least one conductor 470 having a width 472 to be measured, at least one space 474 having a width 476 to be measured, at least one via or bore 480 having an upper diameter, 482, a lower diameter 484 and an aspect ratio to be measured, at least one generally rectangular pad 490 having a width 492 and a length 494 to be measured, and at least one generally circular pad 500 having a lower diameter 502, an upper diameter 504 and an aspect ratio to be measured. It is appreciated that, as is known in the art, an aspect ratio typically indicates a ratio between a first characteristic, such as an upper diameter or width, of a structure, and a second characteristic, such as a lower diameter or width, of the structure, where "upper" and "lower" refer to different positions along a height of the structure.

Figure 5:
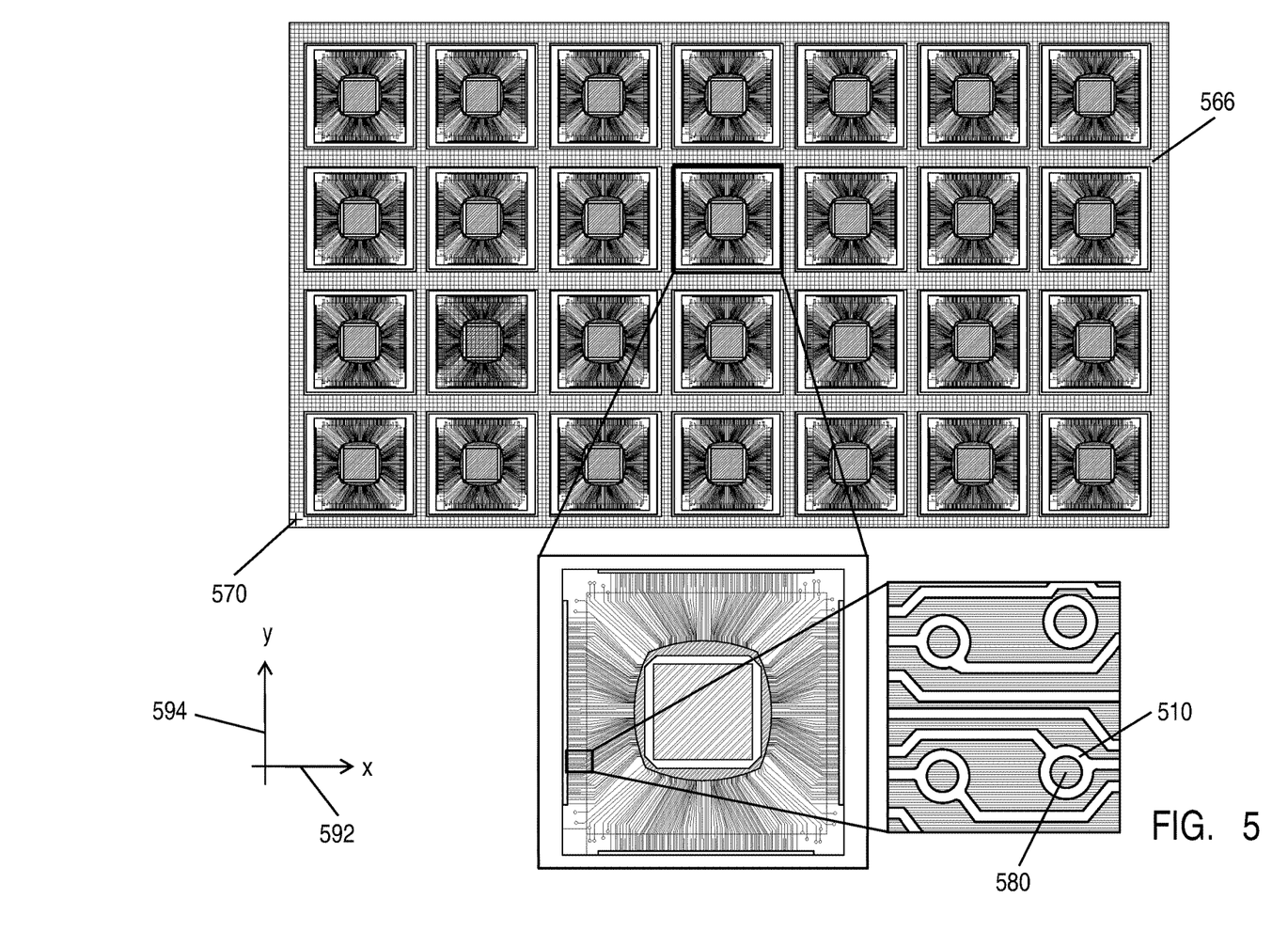
FIG. 5 is a simplified illustration of measurement of spatial coordinates of a selected feature on a patterned object relative to a fiducial.

Reference is now made to FIG. 5, which is a simplified illustration of measurement of the spatial coordinates of a predetermined feature 510 on a patterned object 566, which is an embodiment of patterned object 166, relative to a predefined fiducial 570. In the example shown in FIG. 5, feature 510 is located at a position 580 having x,y coordinates ($x_1$, $y_1$). It is appreciated that the x,y coordinates for features, such as feature 510, on patterned object 566 indicate respective distances in a direction indicated by an x-axis 592 and a y-axis 594 from predefined fiducial 570, which, for ease of calculation, is typically considered to have x,y coordinates (0,0).

Figure 6A:
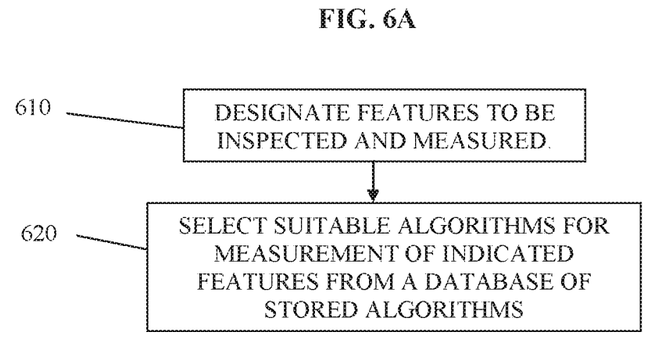
FIGS. 6A and 6B are simplified enhanced detailed flow charts of parts of the portions of the operation of the optical defect detection machine useful in the manufacture of electrical circuits which measures physical attributes of multiple features of patterned objects shown in FIG. 3B.

Reference is now made to FIG. 6A, which is a simplified detailed flow chart of feature selection step 410 of FIG. 3B, forming a portion of the operation of the defect detection machine useful in the manufacture of electrical circuits which measures physical attributes of multiple features of patterned objects.

As seen in FIG. 6A, in a first step 610, various features of a printed circuit to be inspected and measured are designated for measurement, such as the features shown in FIG. 4. This designation may be performed in a variety of ways, such as pre-designation in the CAM data or designation by feature type using a Graphical User Interface (GUI). Some examples of feature types are: all lines having a width of between 30 and 50 microns, all circular pads having a radius below 100 microns, all lines within a designated area on the printed circuit board and all lines that terminate in a circular pad.

Subsequently, as seen in a next step 620, suitable algorithms for measurement of the indicated features are selected from a database of stored algorithms, such as for instance algorithms described in U.S. Pat. Nos. 7,206,443, 7,388,978, 7,200,259 and 7,181,059.

Figure 6B:
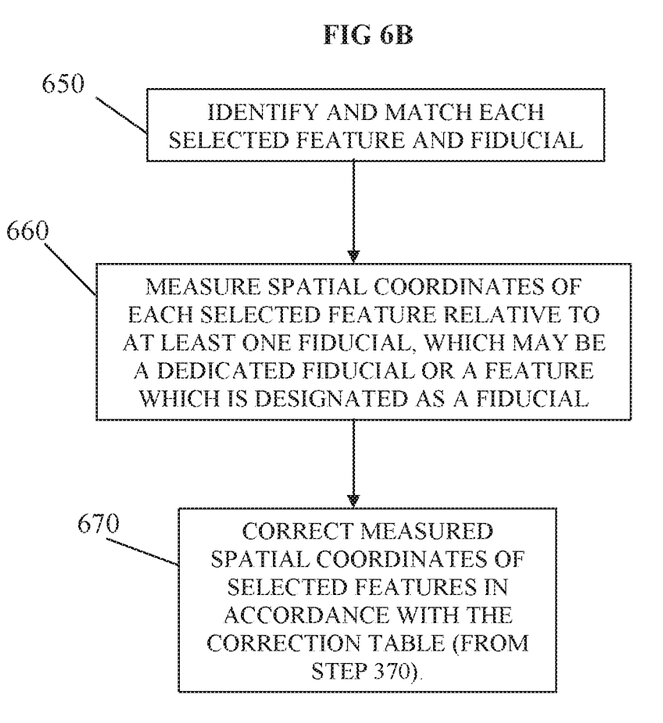

Reference is now made to FIG. 6B, which is a simplified detailed flow chart of algorithm employment step 450 of FIG. 3B, forming a portion of the operation of the defect detection machine useful in the manufacture of electrical circuits which measures physical attributes of multiple features of patterned objects.

As seen in FIG. 6B, in a first step 650, each of the selected features designated in step 610 (FIG. 6A) and the fiducials is identified.

Subsequently, as seen in a next step 660, the spatial coordinates of each of the selected features, relative to the respective fiducial, are ascertained.

As seen in a next step 670, subsequently, the spatial coordinates of the selected features are adjusted in accordance with the correction table of step 380 (FIG. 3A).

It will be appreciated by persons skilled in the art that the present invention is not limited by what has been particularly shown and described hereinabove. Rather the scope of the present invention includes both combinations and subcombinations of various feature of the invention and modifications thereof which may occur to persons skilled in the art upon reading the foregoing description and which are not in the prior art.

The invention claimed is:

1. A method for inspection of multiple features of patterned objects during manufacturing of electrical circuits, the method comprising:
   performing defect detection on said patterned object, employing an optical defect detection machine (ODDM), wherein the patterned object is a printed circuit board, a flexible printed circuit (FPC), or a flat panel display;
   employing said ODDM to output at least one of spatial coordinates and physical attributes of at least some of said multiple features;
   measuring distortion in measurement of said physical attributes of at least some of said multiple features as a function of a location of at least some of said multiple features in a field of view; and
   cropping said field of view to a region having acceptably low distortion.

2. The method for inspection of multiple features of patterned objects according to claim 1, wherein said ODDM comprises a printed circuit board inspection machine and said patterned object is said printed circuit board.

3. The method for inspection of multiple features of patterned objects according to claim 1, wherein said ODDM comprises an automated optical inspection machine for electrical circuits.

4. The method for inspection of multiple features of patterned objects according to claim 1, wherein said employing said ODDM to output includes employing at least one of a motion sensor, an accelerometer, a distance sensor, a 3D sensor and a temperature sensor to increase spatial accuracy of measurement of said physical attributes.

5. The method for inspection of multiple features of patterned objects according to claim 1, wherein said employing said ODDM to output also comprises employing a calibration target.

6. The method for inspection of multiple features of patterned objects according to claim 1, wherein said employing said ODDM to output comprises employing multiple discrete electromagnetic spectral frequency bands.

7. The method for inspection of multiple features of patterned objects according to claim 6, wherein said employing said ODDM to output further comprises employing multiple, mutually spatially offset images at said multiple discrete electromagnetic spectral frequency bands.

8. The method for inspection of multiple features of patterned objects according to claim 7, wherein said employing said ODDM to output further comprises employing said multiple, mutually spatially offset images at said multiple discrete electromagnetic spectral frequency bands to study the way three-dimensional changes in patterned objects are visible in a two-dimensional image.

9. The method for inspection of multiple features of patterned objects according to claim 1, wherein said employing said ODDM to output also comprises employing a high accuracy measurement sensor to detect a bias in measurements by said ODDM and compensating for said bias in run time.

10. The method for inspection of multiple features of patterned objects according to claim 1, wherein said measuring distortion takes place during calibration of said ODDM.

11. The method for inspection of multiple features of patterned objects according to claim 10, wherein said measuring distortion, which takes place during said calibration of said ODDM, includes compensating by employing calibration tables.

12. The method for inspection of multiple features of patterned objects according to claim 1, wherein said measuring distortion takes place during run time of said ODDM.

13. The method for inspection of multiple features of patterned objects according to claim 1, wherein said ODDM is operated, when inspecting multiple identical patterned objects, so as not to measure all of said multiple features of all of said patterned objects in each scan but to ensure that each of said multiple features is measured in at least one scan.

14. The method for inspection of multiple features of patterned objects according to claim 1, wherein said ODDM is operated to produce multiple scans at at least two different resolutions.

15. The method for inspection of multiple features of patterned objects according to claim 14, wherein at least one lower resolution is employed for ensuring positional accuracy and at least one higher resolution is employed for said measuring said attributes.

16. The method for inspection of multiple features of patterned objects according to claim 1, further comprising evaluating, in run time, correspondence between said measurements of said physical attributes and reference CAM data for at least some of said physical attributes in order to compensate for distortions attributable to operation of said ODDM.

17. The method for inspection of multiple features of patterned objects according to claim 16, further comprising compensating in run time for distortions attributable to operation of said ODDM.

18. A system for inspection of multiple features of patterned objects during manufacturing of electrical circuits, the system comprising:
- an inspection subsystem operative to detect defects in said patterned object, wherein the patterned object is a printed circuit board, a flexible printed circuit (FPC), or a flat panel display;
- a physical attribute measurement subsystem operative to output measurements of at least one of physical attributes and spatial coordinates of at least some of said multiple features; and
- a workstation configured to measure distortion in measurement of said physical attributes of at least some of said multiple features as a function of a location of at least some of said multiple features in a field of view and crop said field of view to a region having acceptably low distortion.

19. The system according to claim 18, further comprising at least one of a motion sensor, an accelerometer, a distance sensor, a 3D sensor and a temperature sensor.

20. The system according to claim 18, further comprising a high accuracy sensor.

21. The system according to claim 18, further comprising at least one high accuracy encoder.

* * * * *